US007263664B1

(12) United States Patent
Daughtrey

(10) Patent No.: US 7,263,664 B1
(45) Date of Patent: Aug. 28, 2007

(54) GRAPHICAL USER INTERFACE FOR TRAVEL PLANNING SYSTEM

(75) Inventor: Rodney S. Daughtrey, Cambridge, MA (US)

(73) Assignee: ITA Software, Inc., Cambridge, MA (US)

( * ) Notice: Subject to any disclaimer, the term of this patent is extended or adjusted under 35 U.S.C. 154(b) by 1270 days.

(21) Appl. No.: 09/704,218

(22) Filed: Nov. 1, 2000

(51) Int. Cl.
*G09G 5/00* (2006.01)
(52) U.S. Cl. .................. 715/764; 715/772; 715/760
(58) Field of Classification Search ........ 345/763–765, 345/700, 760, 853–855, 968; 705/5, 26, 705/27; 715/763, 765, 760
See application file for complete search history.

(56) References Cited

U.S. PATENT DOCUMENTS

| 5,253,166 | A | * | 10/1993 | Dettelbach et al. ........... 705/5 |
| 5,559,707 | A | | 9/1996 | DeLorme et al. ........... 364/443 |
| 5,784,583 | A | | 7/1998 | Redpath .................... 395/353 |
| 5,786,816 | A | | 7/1998 | Macrae et al. ............. 345/339 |
| 5,948,040 | A | * | 9/1999 | DeLorme et al. ........... 701/201 |
| 6,307,572 | B1 | * | 10/2001 | DeMarcken et al. ........ 345/763 |
| 6,360,205 | B1 | * | 3/2002 | Iyengar et al. ................ 705/5 |
| 6,442,526 | B1 | * | 8/2002 | Vance et al. ................. 705/5 |

OTHER PUBLICATIONS

Harniman, Brian, Online Travel Sites: Where Do You Really Want to Go Today?, My Mac Magazine Online, Issue #24, Apr. 1997.*
Internet Archive Wayback Machine: Jan. 30, 1997, http://www.expedia.com.*

* cited by examiner

*Primary Examiner*—Kristine Kincaid
*Assistant Examiner*—Thanh Vu
(74) *Attorney, Agent, or Firm*—Fish & Richardson P.C.

(57) ABSTRACT

A user interface for presenting travel itineraries to a user includes an itinerary region for displaying travel itineraries and a filter region. Each travel itinerary has a corresponding value for a first travel criterion and the travel itineraries are grouped into categories based on the values of the first travel criterion. The filter region includes a plurality of cells, each of which is associated with one of the categories of travel itineraries. When a user selects a cell, the itinerary region displays only travel itineraries in the category associated with the selected cell.

26 Claims, 8 Drawing Sheets

Fig. 5

| | | | | | | | | |
|---|---|---|---|---|---|---|---|---|
| Sort by → | Cost | Airline | From/To | Stops | Date | Flight times | Duration | Class | Warnings |
| 1 Details | $127 | US Airways | BOS to LGA<br>LGA to BOS | nonstop<br>nonstop | Sun, Oct 15<br>Sun, Oct 15 | 8:00a-9:13a<br>10:00a-11:19a | 1h 13m<br>1h 19m | Coach<br>Coach | - |
| 2 Details | $127 | US Airways<br>+ others | BOS to LGA<br>LGA to BOS | nonstop<br>nonstop | Sun, Oct 15<br>Sun, Oct 15 | 8:00a-9:13a<br>10:30a-11:39a | 1h 13m<br>1h 9m | Coach<br>Coach | - |
| 3 Details | $127 | US Airways | BOS to LGA<br>LGA to BOS | nonstop<br>nonstop | Sun, Oct 15<br>Sun, Oct 15 | 8:00a-9:13a<br>11:00a-12:11p | 1h 13m<br>1h 11m | Coach<br>Coach | - |
| 4 Details | $127 | US Airways | BOS to LGA<br>LGA to BOS | nonstop<br>nonstop | Sun, Oct 15<br>Sun, Oct 15 | 8:00a-9:13a<br>noon-1:11p | 1h 13m<br>1h 11m | Coach<br>Coach | - |
| 5 Details | $127 | US Airways<br>+ others | BOS to LGA<br>LGA to BOS | nonstop<br>nonstop | Sun, Oct 15<br>Sun, Oct 15 | 8:30a-9:43a<br>10:00a-11:19a | 1h 13m<br>1h 19m | Coach<br>Coach | - |
| 6 Details | $127 | Delta | BOS to LGA<br>LGA to BOS | nonstop<br>nonstop | Sun, Oct 15<br>Sun, Oct 15 | 8:30a-9:43a<br>10:30a-11:39a | 1h 13m<br>1h 9m | Coach<br>Coach | - |
| 7 Details | $127 | Delta<br>+ others | BOS to LGA<br>LGA to BOS | nonstop<br>nonstop | Sun, Oct 15<br>Sun, Oct 15 | 8:30a-9:43a<br>11:00a-12:11p | 1h 13m<br>1h 11m | Coach<br>Coach | - |

GRAPHICAL USER INTERFACE FOR TRAVEL PLANNING SYSTEM

TECHNICAL FIELD

This invention relates to a graphical user interface for a travel planning system.

BACKGROUND

Travel planning systems may be used to search for itineraries that meet a set of criteria submitted, for example, by a potential traveler. The systems produce itineraries and prices by selecting suitable trips or flights from a database of travel carriers, geographic scheduling, and pricing information. Travel planning systems may be computer programs that automate part of the process of identifying the itineraries.

Travel planning systems may display a single list of possible travel itineraries. The traveler browses through the information in the list and compares the details of the different itineraries to select a preferred itinerary. Travelers may have difficulty comparing, discriminating, focusing or assimilating some of the details that are presented in the list.

Many travel systems display travel information on computer systems. Certain travel planning systems may be accessible from remote computer clients over a network, such as the Internet or an Intranet, using a browser such as a web browser. In such travel planning systems, the itineraries may be formatted in a tag-based format, such as HyperText Markup Language (HTML), or eXtensible Markup Language (XML). The itineraries may include links, such as "hyperlinks" or "xlinks", which cause a browser to display a particular set of data.

SUMMARY

According to a first aspect of the invention, an interface for presenting travel itineraries to a user includes an itinerary region for displaying travel itineraries and a filter region. Each travel itinerary has a corresponding value for a first travel criterion and the travel itineraries are grouped into categories based on the values of the first travel criterion. The filter region includes a plurality of cells, each of which is associated with one of the categories of travel itineraries. When a user selects a cell, for example, by using a mouse pointer to click on the cell, the itinerary region displays only travel itineraries in the category associated with the selected cell.

In certain embodiments of the first aspect of the invention, each travel itinerary has a corresponding value for a second different travel criterion and the travel itineraries are also grouped into the categories based on the value of the second travel criterion. The cells are arranged in rows and columns. Cells associated with categories having the same value for the first travel criterion are positioned in the same row, while cells associated with categories having the same value for the second travel criterion are positioned in the same column.

According to a second aspect of the invention, an article includes a machine-readable medium that stores machine-executable instructions. The instructions are operable to cause a machine to generate the user interface of the first aspect of the invention.

According to a third aspect of the invention, a user interface for presenting an itinerary to a user includes a first display of a first segment of the itinerary, such as a travel segment or a layover, and a second display of a subsequent segment of the itinerary. Each of the first display and the second display includes a location of departure and a location of arrival for the corresponding segment of the itinerary. The location of arrival for the first segment is different from the location of departure for the subsequent segment and the first display and the second display are emphasized to indicate to the user that the itinerary has a different location of arrival for the first segment from the location of departure for the subsequent segment. The displays may be emphasized, for example, using italics, font size, font type, bold face font, print color, and background color.

According to a fourth aspect of the invention, a user interface for presenting an itinerary to user includes a display of a segment, such as a travel segment or a layover, of the itinerary. The display includes a location of departure and a location of arrival for the first segment, a duration for the first segment, and at least one of a departure time and an arrival time.

According to a fifth aspect of the invention, a user interface for presenting an itinerary to user, includes a display of a segment of the itinerary and an alert associated with the first segment. The alert is emphasized to bring it to the attention of the user.

Among other advantages of the invention, the filter region allows a user to easily filter a certain category of travel itineraries that the user may be interested in without necessarily having to comb through the list of itineraries. The emphasis and the alerts point out information that is likely to interest the user. Thus the invention provides an efficient way to present travel information to the user, making the users experience more productive pleasurable and effective.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 3-5 are diagrams of web pages depicting results of executing a query for a round trip based on information entered through the query screen of FIG. 2.

FIGS. 7 and 8 are diagrams of web pages depicting details of travel options provided in the web pages of FIGS. 3-5.

DETAILED DESCRIPTION

Figure 1:
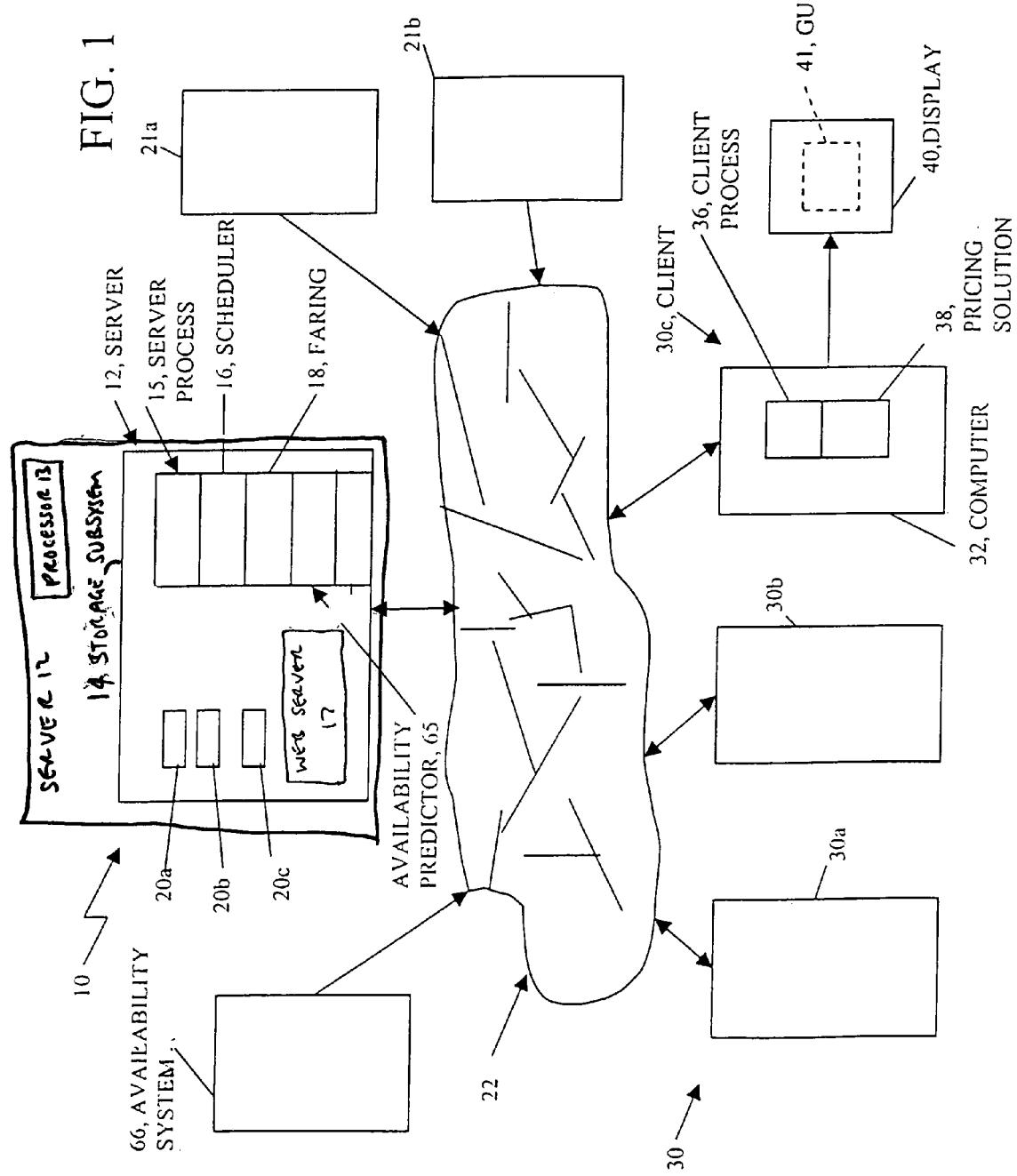
FIG. 1 is a block diagram of a client server travel planning system particularly operable over a network such as the Internet.

Referring to FIG. 1, a travel planning system 10 can be used to search for travel and pricing information associated with various forms of travel such as airline, bus and railroad and is particularly adapted for air travel. As will be described below, users at client computers 30 use a client process 36, such as a web browser, to submit queries requesting information to the server 12 over a network 22, such as the Internet or an intranet. The server 12 retrieves travel and pricing information corresponding to the query and transmits the information to the client computer 32. A client process 36, such as a web browser, on the client computer 30 displays the transmitted information in a graphical user interface 41 on a display 40 associated with client computer 32. The graphical user interface 40 may, for example, include a series of web pages presented to the user on the web browser 36.

Server computer 12 has a processor 13 for executing computer programs stored within storage subsystem 14. Storage subsystem 14 may include a memory, hard disk, cdrom disk, or a floppy disk. The computer programs include a web server 17 for sending web pages and receiving requests from the network 22. The web pages include a user interface used to display query screens and travel and pricing information as described in FIGS. 2-8 below. The computer programs also include a server process 15 that has a scheduling process 16 that determines itineraries associated with a query from a client computer and a faring process 18 that determines faring information associated with the itineraries. An example of a scheduler process 16 is described in copending U.S. patent application Ser. No. 09/109,622, entitled "Scheduler System for Travel Planning Systems", filed on Jul. 2, 1998 by Carl-G. DeMarcken et al. and assigned to the assignee of the present invention and incorporated herein by reference. Also an example of a faring process 18 is described in copending U.S. patent application Ser. No. 09/109,873, entitled "Graphical User Interface for Travel Planning System", filed on Jul. 2, 1998 by Carl G. DeMarcken et al and also assigned to the assignee of the present invention and incorporated herein by reference.

Figure 2:
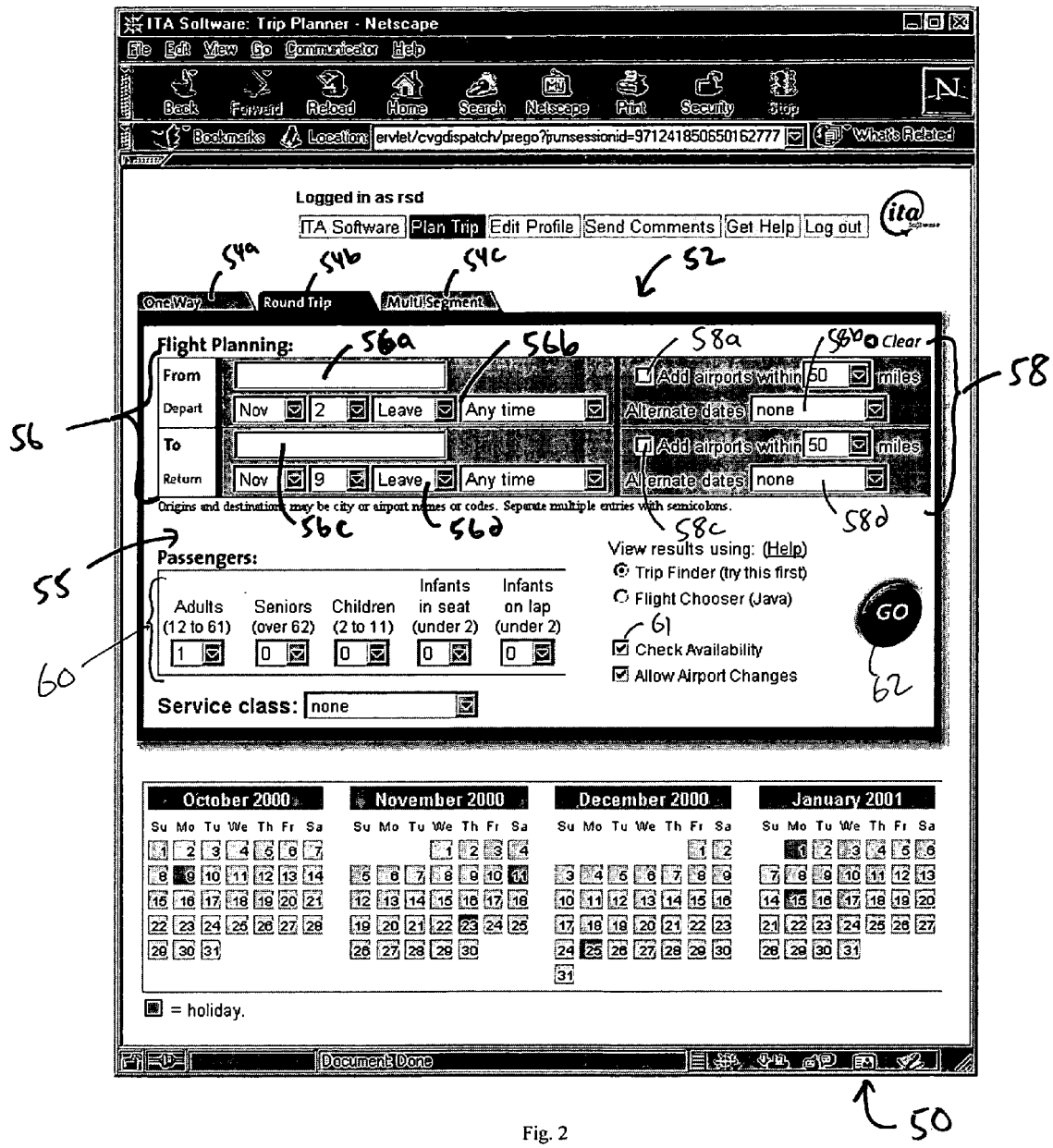
FIG. 2 is a diagram of a query screen for a graphical user interface implemented as a web page from a web browser.

Referring also to FIG. 2, web browser 36 displays a web page 50 to a user to allow the user to submit a query to the server 12. The web page 50 includes a query table 52 having tabs 54a-54c associated with the different types of itineraries that the user is interested in. For example the first tab 54a is associated with one-way itineraries, the second tab 54b is associated with round trip itineraries and the third tab 54c is associated with multi-segment itineraries. To display a query input interface 55 for a certain kind of travel itinerary, the user selects the tab corresponding to the kind of itinerary, for example, by using a mouse pointer associated with the client computer 32 to click on the tab 54. The tabs 54 may be links, such as hyperlinks or xlinks, that cause the browser 36 to load the desired query input interface 55. FIG. 2 shows a query input interface 55 for a round trip itinerary.

The query input interface 55 includes a section 56 for entering flight information such as a location of departure 56a, a departure time 56b, a location of arrival 56c and a time of arrival 56d. The query input interface 55 also includes a section 58 for selecting flight saving options. For example, a user may use inputs 58a, 58b to cause the server to search for cheaper flights in airports close to the desired departure and arrival airports. A user may also use inputs 58b, 58d to allow the server 12 to search for cheaper flights on alternate travel dates. The query input interface further includes a section 60 to select such passenger information as the number of passengers traveling and the number of those passengers that are seniors, infants or children. The user may check input 61 to cause the server 12 to only provide travel itineraries associated with flights that have available seats. The user submits a query to the server 12 by clicking on the submission button 62, causing the server to send travel and pricing information to the client 30. The travel information is displayed in a user interface described below with reference to FIG. 3.

Figure 3:
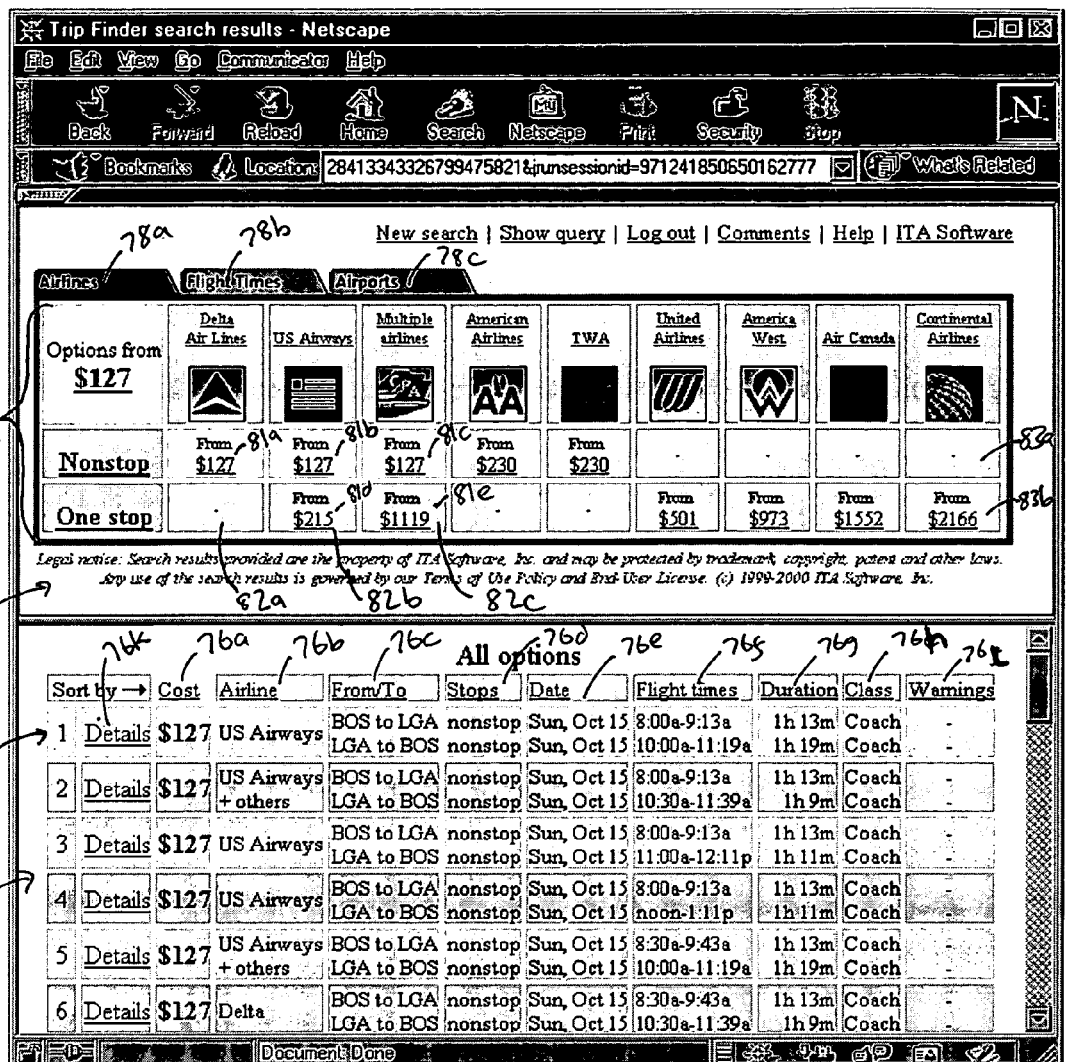
Figure 7:
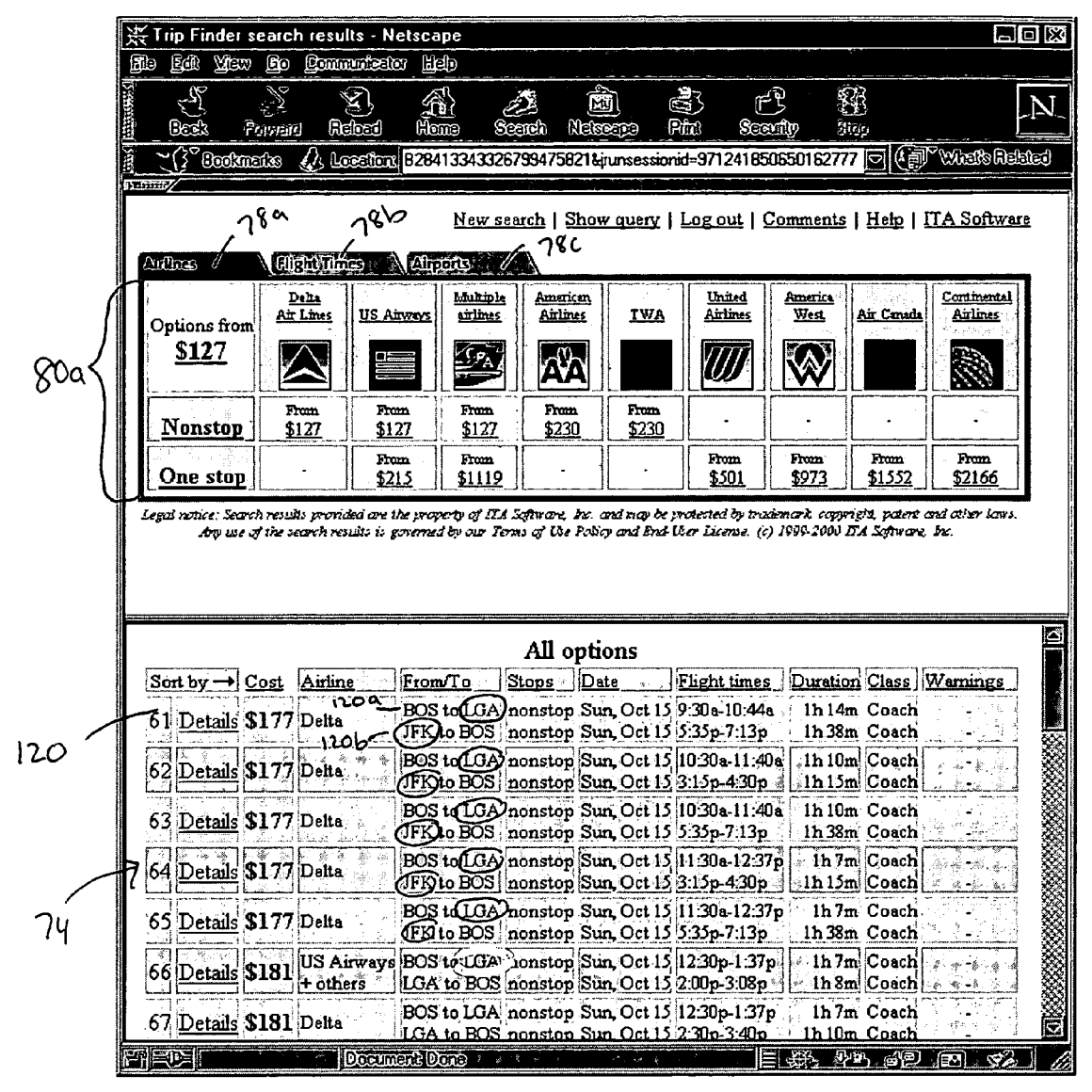
Figure 8:
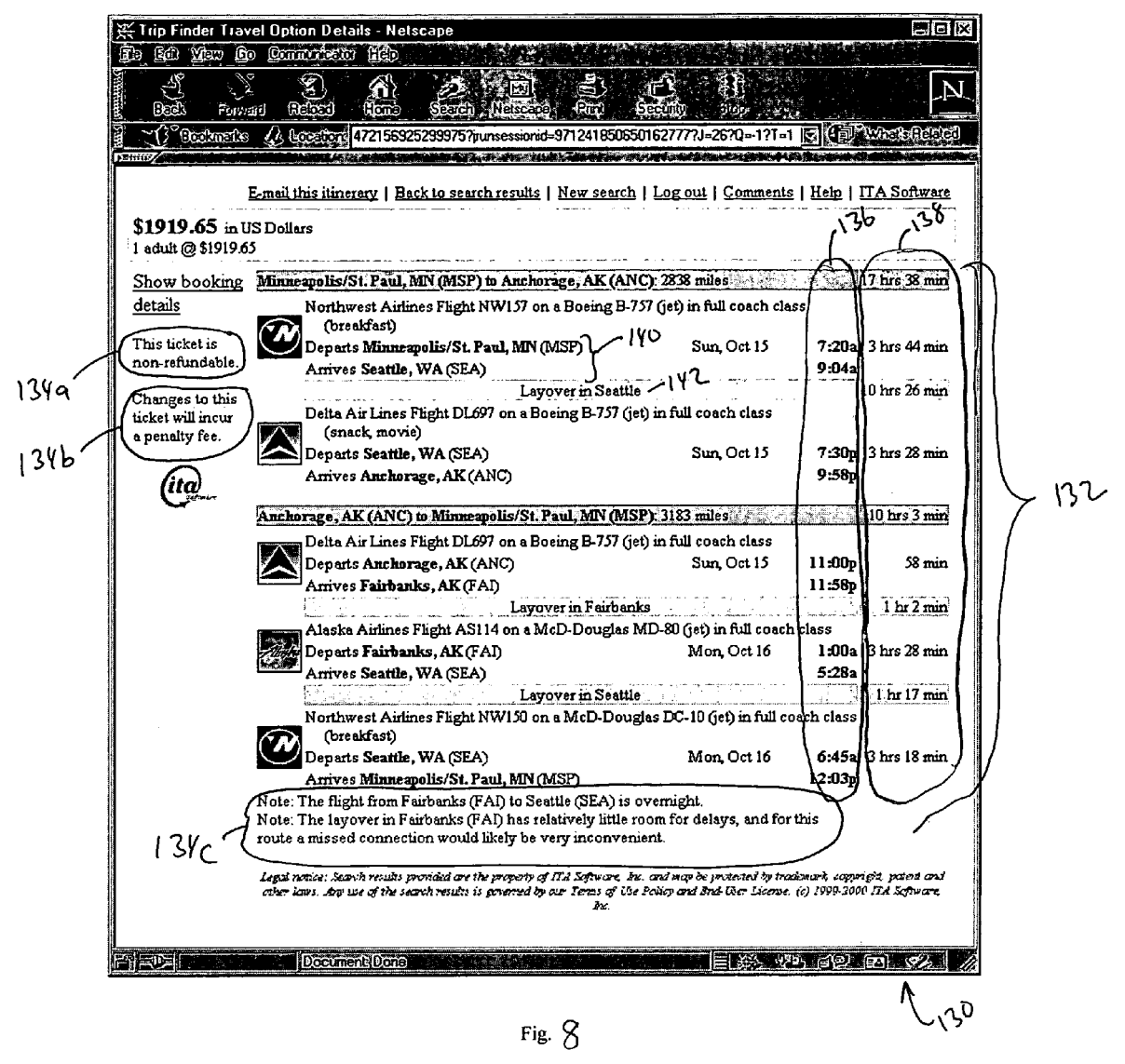

Referring to FIG. 3, a web page 70 for displaying travel and pricing information includes an itinerary region 72 that displays different itinerary choices and a filter region 74 for selecting the itinerary choices that are to be displayed in the itinerary region 72. The itinerary region 72 and the filter region 74 may be different HTML frames of the web page 70. The itinerary region displays a separate itinerary 72a in each row of the itinerary region 72. Each itinerary is displayed along with corresponding values for a series of travel criterion that a user might use to identify a preferred itinerary. For example, each itinerary is displayed along with a cost of travel 76a, an airline carrier that provides the flights 76b, destination and arrival airports 76c, the number of stops on the itinerary 76d, the travel date 76e and time 76f, the duration of each segment of the flight 76g, and the class of travel 76h. A user may also display more information about an itinerary 72a by clicking on a "details" link 76k associated with the itinerary. The details link 76k may be a link, such as a hyperlink or an xlink, that causes the browser 36 to load a web page containing the details of the itinerary, as shown in FIGS. 7 and 8.

The filter region includes tabs 78a, 78b, 78c that a user may select to display itineraries based on a criterion associated with the tab. For example tab 78a allows the user to select the itineraries 72a displayed in the itinerary region 72 based on the airline that provides the flights, tab 78b allows the user to select itineraries based on the flight times, and tab 78c allows the user to select the itineraries based on the airports. Upon selecting one of the tabs, for example, by using a mouse pointer to click on the tab, a filtering table 80 is displayed in the filter region. For example, FIG. 3 shows an airline-filtering table 80a that is displayed when a user clicks the first tab 78a. The tabs 78 may be links that cause the browser 36 (FIG. 1) to load the desired filtering table 80.

Each filtering table 80 includes a series of cells 81 which are arranged in columns 82 and rows 83. The filtering table 80 groups the travel itineraries into categories based on certain travel criterion. For example, in the airline-filtering table 80a, the itineraries 72a are grouped into categories based on the airline 76b providing the flights and the number of stops 76d in the itinerary. Each category contains itineraries that have the same number of stops 76d and are provided by the same airline 76b. Certain cells 81 in table 80a are associated with a specific category of travel itineraries. A user may cause the itinerary region 72 to only display travel itineraries 72a associated with a category by selecting the cell 81 associated with the category, for example by using a mouse pointer to click on the cell 81. The cell 81 may be associated with a link that causes the browser 36 to load the relevant category of itineraries 72a in the itinerary region 72. Thus the cells provide a convenient graphical way for a user to select a certain category of travel itineraries. Cells associated with categories that do not contain any itineraries may not be associated with a link.

In each filtering table 80 cells associated with categories of itineraries having the same value of one of the filtering criteria are arranged in the same row, while cells associated with the categories having the same value of the other filtering criteria are arranged in the same column. For example, in the filtering table 80a, cells 81 associated with categories of itineraries provided by the same airline are arranged in the same column 82 and cells associated with categories of itineraries with the same number of stops are arranged in the same row 83. For instance, the column 82b is associated with itineraries where the flights are provided by US Airways, while the row 83a is associated with non-stop itineraries. To display non-stop itineraries provided by US Airways, the user would select the cell 81b that is positioned at the intersection of column 82b and row 83a.

Thus, the grid-like arrangement of the cells allows us user to quickly and conveniently display itineraries in which the user is interested.

Additionally, each cell 81 also displays information about the category of itineraries 72a with which it is associated. For example, the cells in the filtering table 80a display a minimum cost of travel associated with the itineraries in the category corresponding to the cell. For instance the cell 81b, mentioned in the example above, displays the amount $127 to indicate to the user that the user should expect to pay at least $127 if he intends to fly non-stop on US Airways. If that amount is out of the user's price range, the user can look to other categories of flights. Thus, displaying additional information about the categories of itineraries in the cells 81 allows a user to more quickly and conveniently select itineraries that might be of interest.

Figure 4:
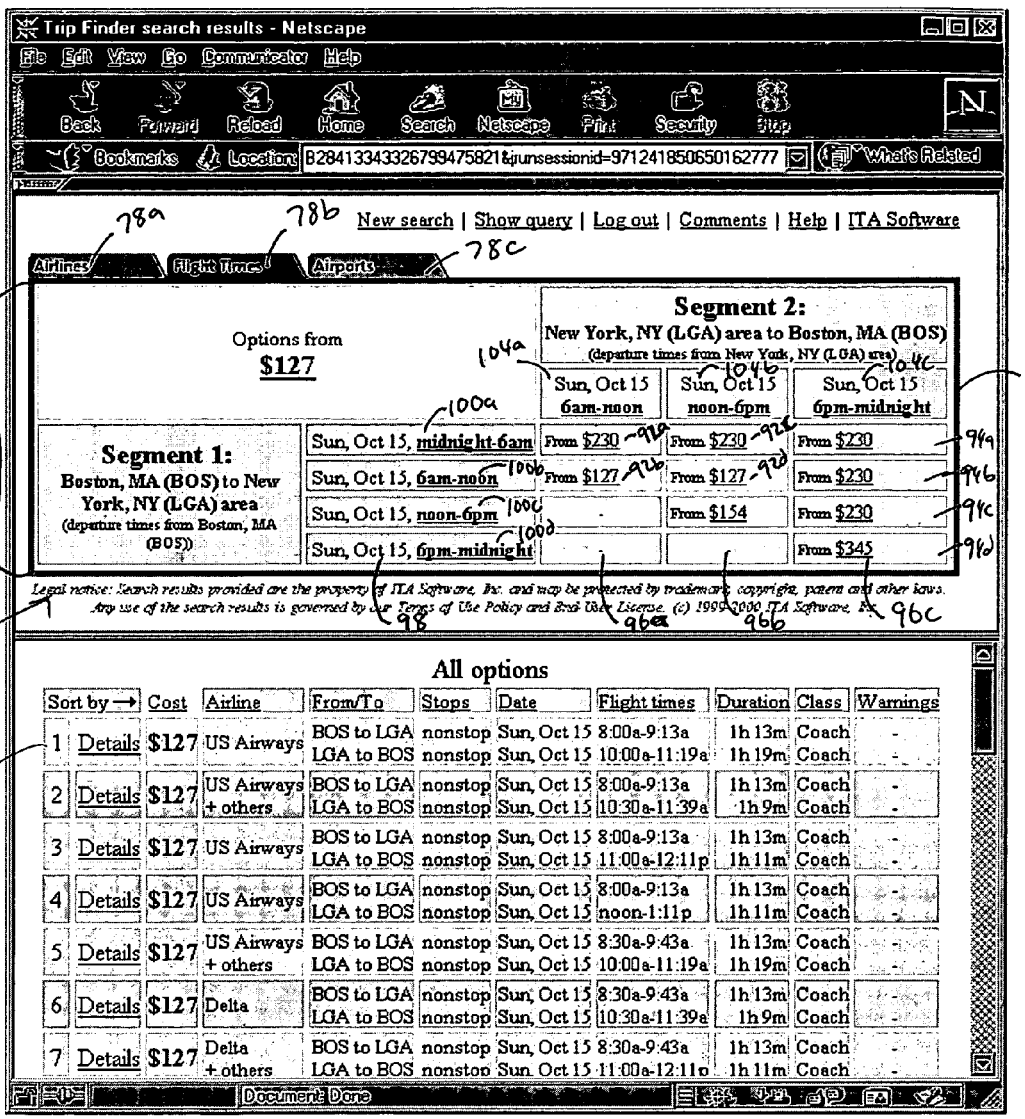

Referring to FIG. 4, when the flight-times tab 78b is selected, a filtering table 80b is displayed in filtering region 74. Filtering table 80b groups the itineraries 72a into categories based on a departure time from the location of origin and a departure time from a destination of the itinerary. Each cell 92a is associated with a category and a user may display itineraries associated with the category by selecting the cell. Cells 92 are arranged in rows 94 with each row containing cells that are associated with flights that have the same departure time from the point of origin (Boston). For example, row 94a contains cells associated with flights departing Boston between midnight and 6 am on Sunday, October 15. The cells are also arranged in columns 96 with each column containing cells that are associated with flights that are in the same departure time range from the destination (New York). For example, column 96a contains cells associated with flights departing New York between 6 am and noon on Sunday, October 15.

Filter table 80b also contains a column 98 containing row super-cells 100a-100d. Each row super-cell 100 is associated with a super-category containing all the itineraries associated with the categories of all the cells 92 in the same row as the row super-cell 100. For example, the row super-cell 100a is associated with all itineraries that depart Boston between midnight and 6 am on Sunday, October 15, irrespective of the time that the itineraries depart New York. Table 80b also includes a row 102 that contains column super-cells 104a-104c. Each column super-cell 104 is associated with a super-category containing all the itineraries associated with the categories of all the cells 92 in the same column as the super-cell 104. For example, the column super-cell 104a is associated with all itineraries that depart New York between 6 am and noon on Sunday, October 15, irrespective of the time that the itineraries depart Boston. The super-cells 100, 104 allow a user to select itineraries 72a based only on one of the criteria (origin departure time and destination departure time) that is used to group the itineraries 72a into categories. A similar arrangement is provided for the carrier by the number of stops table and the outbound airports by return airports table.

Referring to FIG. 5, when the airport tab 78c is selected, the airports filtering table 80c is displayed in the filtering region 74. The filtering table 80c groups the itineraries 72a into categories based departure and arrival airports 76c. Each cell 112 is associated with a category and a user may display itineraries associated with the category by selecting the cell 112. Cells 112 are arranged in rows 114 with each row containing cells that are associated with flights that have the same departure airport. In the Example of FIG. 5, there is only one row 114 because all the flights depart from Boston. The cells 112 are also arranged in columns 116 with each column containing cells 112 that have the same destination airport. For example, column 116a contains a cell 112a associated with itineraries with a departing flight from JFK airport in New York, while column 116b contains a cell 112b associated with itineraries with a departing flight from La Guardia airport in New York.

Figure 6:
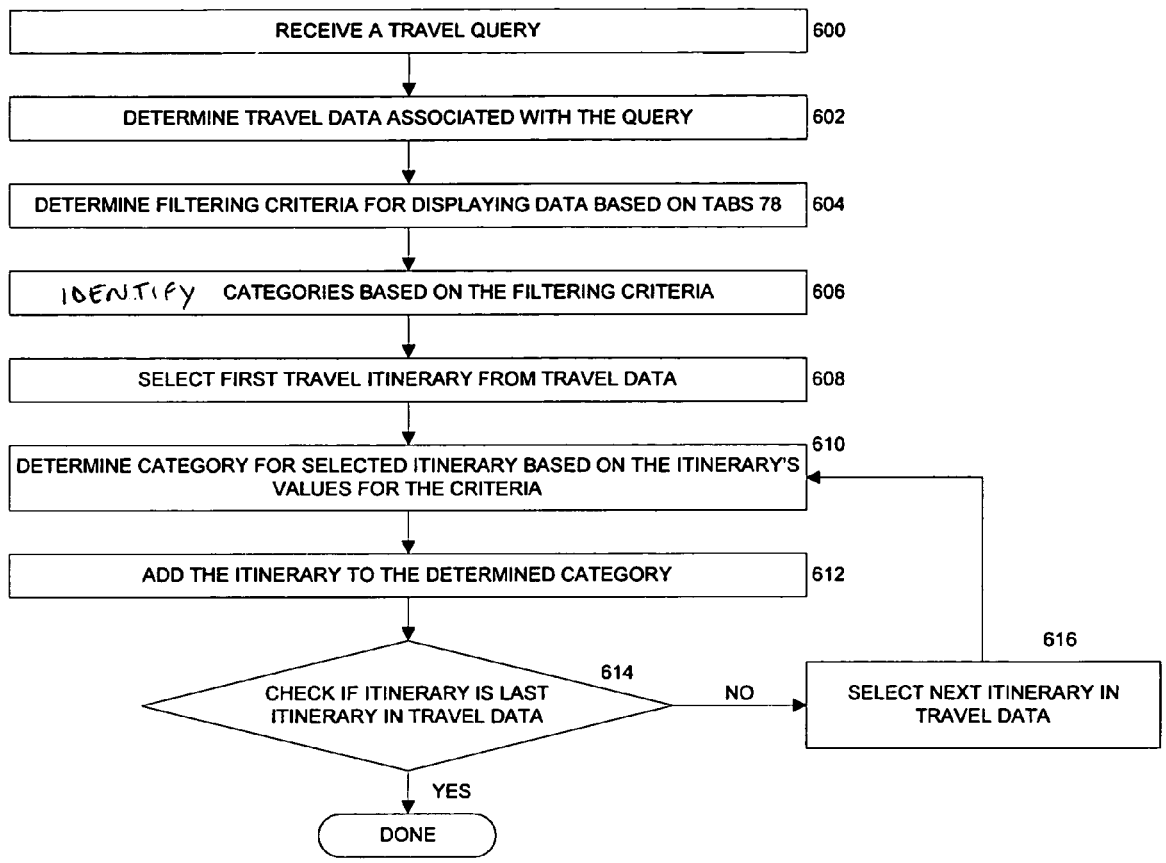
FIG. 6 is a flow chart of the process for generating the web pages of FIGS. 3-5.

Referring to FIG. 6, the process of displaying the travel data in the web page 70 of FIGS. 3-5 begins when the server 12 receives (600) a query from a user. The query may have been submitted from the web page 50 of FIG. 2. The scheduling process 16 of the server determines (602) travel data associated with the query. The server then determines (604) filtering criteria for grouping the itineraries into categories, for example, from a tab 78a-78c selected by the user on the web page 70 of FIGS. 3-5. Where a tab has not been selected, the server may select a default set of criteria. For example, in FIG. 3, the server 12 groups the itineraries based on airlines and number of stops by default. The server 12 then identifies (606) the different categories that the travel itineraries will be grouped into based on values associated with the criteria.

The server 12 selects (608) the first travel itinerary from the travel data and determines (610) a category that the travel itinerary should be grouped into based on the values of the filtering criteria for the itinerary. The server 12 then adds (612) the itinerary to the determined category and checks (614) if the itinerary is the last one in the travel data. If it is not the last one, the server 12, selects (616) the next itinerary in the travel data and performs the process (610-614) for the next itinerary. Otherwise, if there are no more itineraries the server terminates the process. The categorized data is provided to the client computer 30 for display as part of the graphical user interface 41 from FIG. 1.

Referring to FIG. 7, a travel itinerary 120 may have a first segment 120a and a second segment 120b. In a round trip itinerary, the second segment may be a return segment for the first segment. The second segment may also be a connecting flight to the passenger's destination. In the exemplary itinerary 120, the first segment 120a departs from Logan airport (BOS) in Boston and arrives at La Guardia airport (LGA) in New York. However, the second segment departs from John F. Kennedy Airport (JFK) in New York. Consequently, the passenger would have to travel from the arrival airport of the first segment (LGA) to the departure airport of the second segment (JFK) by some other means besides flying to make a connection from the first segment to the second segment. This situation is referred to as a discontinuous flight connection.

The region 74 brings the user's attention to the discontinuity in itinerary 120 by, for example, emphasizing the airports LGA, JFK associated with the discontinuity. The server 12 is programmed to detect such discontinuities and may be configured to emphasize the airports LGA, JFK using italics, font size, font type, bold face font, print color, background color and so forth. For example, the airports LGA, JFK associated with the discontinuity may be emphasized by displaying them in red typeface while the rest of the display is displayed in normal black typeface.

Discontinuity in an itinerary may also occur between the starting airport and the ultimate destination in a return trip. For example, if a user was planning a trip from Boston Mass. to New York and then back to Boston, a travel itinerary from Boston to New York and then to Worcester Mass. (a suburb of Boston) is discontinuous because the user must use another means of travel other than flying to get from Worcester to Boston.

As shown in FIG. 8, the graphical user interface 41 (FIG. 1) displays a web page 130 containing additional details 132 about a travel itinerary 72a (FIG. 3) when the user clicks on the details link 76k (FIG. 3). Included in the additional details 132 is information 134a-c about the flight that may be considered undesirable. For example, the information 134a-c may be notification of a non-refundable ticket 134a, or notification 134b that the user would have to pay a fee to change the ticket. The information 134 may also include information 134c about a possible undesirable long layover or a short layover that may make it difficult to make the connecting flight.

The information 134a-c is emphasized to bring it to the user's attention and make it immediately identifiable. For example, the server 12 may be configured to present the undesirable characteristics of an itinerary in red typeface or in capital letters as is done with the information 134a-c, to make the information more noticeable to the user. On the other hand, information considered desirable might be emphasized in a more calming way. For example, it may be emphasized using a green typeface or by using italics.

The web page 130 of FIG. 8 also shows the durations associated with the different flight segments of the itinerary, in addition to departure and arrival times of the segments. The duration of layovers 142 between flight segments is also shown. The duration information allows a user to immediately know how long the flight segments/layovers between segments will last while the arrival and departure time inform the user of the time when the segments will begin or end, making the itinerary easier to understand.

A number of embodiments of the invention have been described. Nevertheless, it will be understood that various modifications may be made without departing from the spirit and scope of the invention. For example, the invention may be implemented in travel systems that do not communicate over the Internet or in interfaces that do not use web pages or web browsers.

Accordingly, other embodiments are within the scope of the following claims.

What is claimed is:

1. A user interface displayed on a display and produced by execution of instructions residing on a computer readable medium, the user interface for presenting travel itineraries to a user, the user interface comprising:
   an itinerary region for displaying segments of travel itineraries, each travel itinerary having a corresponding value for a first travel criterion, the travel itineraries being grouped into a first set of categories based on the values of the first travel criterion; and
   a filter region including a plurality of cells, each cell associated with one of the first set of categories of travel itineraries, with selecting of one of the plurality of cells in the filter region, causing the itinerary region to display only travel itineraries in the one of the first set of categories associated with the selected cell in the filter region; and
   an indicator applied to any first segment of any itinerary that has a location of arrival for the first segment that is different from a location of departure for the next segment of the itinerary to indicate to the user that the itinerary has different locations of arrival and departure for the first and the next segments.

2. The user interface of claim 1 wherein each travel itinerary has a corresponding value for a second different travel criterion, the travel itineraries being grouped into the first set of categories based also on the value of the second different travel criterion and the cells are arranged in rows and columns, with cells associated with the first set of categories having the same value for the first travel criterion being positioned in the same row and cells associated with the first set of categories having the same value for the second travel criterion being positioned in the same column.

3. The user interface of claim 1 wherein the filter region further includes a plurality of tabs; and the user causes the filter region to display the plurality of cells associated with the first set of categories based on the first criterion by selecting a tab.

4. The user interface of claim 1 wherein the indicator is at least one of italic, font size, font type, bold face font, print color, or background color applied to the text representing the airports.

5. The user interface of claim 4 wherein the at least one of the plurality of cells displays a cost of travel.

6. The user interface of claim 1 wherein the first travel criterion is selected from a group that includes airline, departure time, arrival time, location of departure, location of arrival, number of stops, cost, travel restrictions, expected delays, and safety records.

7. The user interface of claim 1 wherein the indicator is applied to the airports associated with the segments.

8. The user interface of claim 1 wherein at least one of the itinerary and filter regions is represented in a tagged format and the tagged format is either Hypertext Markup Language or extensible Markup Language.

9. The user interface of claim 1 wherein at least one of the plurality of cells is associated with a link, the link causing the itinerary region to display only travel itineraries in the one of the first set of categories associated with the cell when a user selects the cell.

10. The user interface of claim 9 wherein the link is either an xlink or a uniform resource location link.

11. The user interface of claim 1 wherein the itinerary region further displays a detail link associated with each itinerary, the detail link being configured to display detailed information about the itinerary associated with the link when the link is selected.

12. An article comprising a machine-readable medium which stores machine-executable instructions for generating a user interface for presenting travel itineraries to a user, the instructions operable to cause a machine to generate a user interface comprising:
   an itinerary region for displaying travel itineraries, each travel itinerary having a corresponding value for a first travel criterion, the travel itineraries being grouped into a first set categories based on the value of the first travel criterion; and
   a filter region including a plurality of cells and each cell associated with one of the first set of categories of travel itineraries; and
   an indicator that is applied to any first segment of an itinerary having a location of arrival for the first segment that is different from a location of departure for the next segment of the itinerary to indicate to the user that the itinerary has a different location of arrival for the first segment from the location of departure for the next segment.

13. The article of claim 12 wherein each travel itinerary has a corresponding value for a second different travel criterion, the travel itineraries being grouped into the first set of categories based also on the value of the second different travel criterion and the cells are arranged in rows and columns, with cells associated with first categories having the same value for the first travel criterion being positioned in the same row and cells associated with first categories having the same value for the second travel criterion being positioned in the same column.

14. The article of claim 12 wherein the filter region further includes a plurality of tabs; and the user causes the filter region to display the plurality of cells associated with categories based on the first criterion by selecting a tab.

15. The article of claim 12 wherein the indicator is at least one of italic, font size, font type, bold face font, print color, or background color applied to the text representing the airports.

16. The user interface of claim 15 wherein the at least one of the plurality of cells displays a cost of travel.

17. The article of claim 12 wherein the first travel criterion is selected from a group that includes airline, departure time, arrival time, location of departure, location of arrival, number of stops, cost, travel restrictions, expected delays, and safety records.

18. The article of claim 17 wherein the tagged format is either Hypertext Markup Language or eXtensible Markup Language.

19. The article of claim 17 wherein at least one of the plurality of cells is associated with a link, the link causing the itinerary region to display only travel itineraries in the one of the first set of categories associated with the cell when a user selects the cell.

20. The article of claim 12 wherein the indicator is applied to the airports associated with the segments.

21. The article of claim 20 wherein the link is either an xlink or a uniform resource location link.

22. The article of claim 12 wherein the itinerary region further displays a detail link associated with each itinerary, the detail link being configured to display detailed information about the itinerary associated with the link when the link is selected.

23. A user interface displayed on a display and produced by execution of instructions residing on a computer readable medium, the user interface for presenting travel itineraries to a user the user interface comprising:

a first region to display a first segment of an itinerary including a location of departure and a location of arrival for the first segment; and a second region to display the next segment of the itinerary including a location of departure and a location of arrival for the next segment with the location of arrival for the first segment being different from the location of departure for the next segment and at least one of the first region and the second region is emphasized to indicate to the user that the itinerary has a different location of arrival for the first segment from the location of departure for the next segment.

24. The user interface of claim 23 wherein at least one of the location of arrival for the first segment and the location of departure for the next segment is emphasized by at least one of italics, font size, font type, bold face font, print color, and background color.

25. An article comprising a machine-readable medium which stores machine-executable instructions for generating a user interface for presenting a travel itinerary to a user, the instructions operable to cause a machine to generate a user interface comprising:

a first region to display a first segment of the itinerary including a location of departure and a location of arrival for the first segment; and a second region to display the next segment of the itinerary including a location of departure and a location of arrival for the next segment; and an indicator to indicate that the location of arrival for the first segment is different from the location of departure for the next segment.

26. The article of claim 25 wherein the indicator is at least one of italics, font size, font type, bold face font, print color, and background color applied to at least one of the location of arrival for the first segment and the location of departure for the next segment.

* * * * *